(12) United States Patent
Kumar et al.

(10) Patent No.: US 10,572,932 B2
(45) Date of Patent: Feb. 25, 2020

(54) SYSTEM FOR PROVIDING OPTIMAL SHOPPING ROUTES IN RETAIL STORE AND METHOD OF USING SAME

(71) Applicant: Wal-Mart Stores, Inc., Bentonville, AR (US)

(72) Inventors: Ashwin Kumar, Bangalore (IN); Ameya Ajay Shendre, Bangalore (IN); Pratosh Deepak Rajkhowa, Bangalore (IN); R R Pavan Kumar, Bangalore (IN)

(73) Assignee: WALMART APOLLO, LLC, Bentonville, AR (US)

( * ) Notice: Subject to any disclaimer, the term of this patent is extended or adjusted under 35 U.S.C. 154(b) by 366 days.

(21) Appl. No.: 15/418,162

(22) Filed: Jan. 27, 2017

(65) Prior Publication Data

US 2018/0218441 A1  Aug. 2, 2018

(51) Int. Cl.
*G06Q 30/00* (2012.01)
*G06F 17/30* (2006.01)
*G06Q 30/06* (2012.01)

(52) U.S. Cl.
CPC ................ *G06Q 30/0639* (2013.01)

(58) Field of Classification Search
CPC .................................................. G06Q 30/0639
See application file for complete search history.

(56) References Cited

U.S. PATENT DOCUMENTS

| | | | |
|---|---|---|---|
| 6,246,998 B1 | 6/2001 | Matsumori | |
| 7,147,154 B2 * | 12/2006 | Myers | G06Q 20/343 |
| | | | 235/383 |
| 7,295,990 B1 | 11/2007 | Braumoeller et al. | |
| 7,747,543 B1 | 6/2010 | Braumoeller et al. | |
| 7,949,686 B2 | 5/2011 | Chang et al. | |
| 8,005,761 B1 | 8/2011 | Braumoeller et al. | |
| 8,121,876 B1 | 2/2012 | Braumoeller et al. | |

(Continued)

FOREIGN PATENT DOCUMENTS

| | | |
|---|---|---|
| CN | 101778045 A | 7/2010 |
| CN | 101964799 A | 2/2011 |

(Continued)

OTHER PUBLICATIONS

Ertekin, S., & Pelton, L. E. (2015). Navigating the Retail Environment: An Exploratory Investigation of In-Store Mapping Applications. Academy of Marketing Studies Journal, 19(2), 37-48. Retrieved from https://search.proquest.com/docview/1750421168?accountid=14753.*

*Primary Examiner* — Kathleen Palavecino

(74) *Attorney, Agent, or Firm* — Bryan Cave Leighton Paisner LLP

(57) ABSTRACT

A system and method includes receiving a shopping list of one or more items inputted by a user into a user application running on the user device, generating a pick path through a retail store to pick the one or more items according to an optimization algorithm that generates the pick path based on XY location information of the one or more items within the retail store, obtaining a store map, the store map being indicative of a layout of the retail store, transmitting a representation of the store map and the pick path to the user device, and displaying the store map overlaid with the pick path on a graphical display of the user device.

20 Claims, 6 Drawing Sheets

(56) References Cited

U.S. PATENT DOCUMENTS

| | | |
|---|---|---|
| 8,201,737 B1 | 6/2012 | Palacios Durazo et al. |
| 8,401,914 B1 | 3/2013 | Kim |
| 8,428,988 B1 | 4/2013 | Braumoeller et al. |
| 8,818,836 B1 | 8/2014 | Braumoeller et al. |
| 9,147,208 B1 | 9/2015 | Argue et al. |
| 9,466,045 B1 | 10/2016 | Kumar |
| 9,470,532 B2 | 10/2016 | Pellow et al. |
| 9,626,709 B2 | 4/2017 | Koch et al. |
| 10,127,514 B2 | 11/2018 | Napoli |
| 2002/0198756 A1 | 12/2002 | Ghaisas et al. |
| 2003/0033177 A1 | 2/2003 | MacGonigle et al. |
| 2003/0177072 A1 | 9/2003 | Bared |
| 2004/0010437 A1 | 1/2004 | Kiran et al. |
| 2004/0068443 A1 | 4/2004 | Hopson et al. |
| 2004/0210621 A1 | 10/2004 | Antonellis |
| 2005/0278062 A1 | 12/2005 | Janert et al. |
| 2007/0174144 A1 | 7/2007 | Borders et al. |
| 2007/0244758 A1 | 10/2007 | Xie |
| 2007/0250355 A1 | 10/2007 | Leet et al. |
| 2009/0048878 A1 | 2/2009 | Metcalf |
| 2009/0157472 A1 | 6/2009 | Burazin et al. |
| 2009/0281921 A1 | 11/2009 | Foster et al. |
| 2010/0010902 A1 | 1/2010 | Casey |
| 2010/0287025 A1 | 11/2010 | Fletcher et al. |
| 2012/0023034 A1* | 1/2012 | Lynch ............... G06Q 30/0281 705/346 |
| 2012/0123674 A1 | 5/2012 | Perks et al. |
| 2012/0150340 A1 | 6/2012 | Suess et al. |
| 2012/0330458 A1 | 12/2012 | Weiss |
| 2013/0030955 A1 | 1/2013 | David |
| 2013/0231990 A1 | 9/2013 | Munjal et al. |
| 2013/0332273 A1* | 12/2013 | Gu ..................... G06Q 30/0205 705/14.53 |
| 2013/0346204 A1 | 12/2013 | Wissner-Gross et al. |
| 2014/0003727 A1 | 1/2014 | Lodz et al. |
| 2014/0040075 A1 | 2/2014 | Perry et al. |
| 2014/0095350 A1 | 4/2014 | Carr et al. |
| 2014/0136255 A1 | 5/2014 | Grabovski et al. |
| 2014/0156553 A1 | 6/2014 | Leach et al. |
| 2014/0207615 A1 | 7/2014 | Li et al. |
| 2014/0266616 A1 | 9/2014 | Jones et al. |
| 2014/0278627 A1 | 9/2014 | Grabovski et al. |
| 2014/0279294 A1 | 9/2014 | Field-Darragh |
| 2014/0324491 A1 | 10/2014 | Banks et al. |
| 2014/0336814 A1 | 11/2014 | Moore et al. |
| 2014/0351101 A1 | 11/2014 | Danelski |
| 2014/0379529 A1 | 12/2014 | Agasti et al. |
| 2015/0051994 A1 | 2/2015 | Ward et al. |
| 2015/0170256 A1 | 6/2015 | Pettyjohn |
| 2015/0206093 A1 | 7/2015 | Trew et al. |
| 2015/0242918 A1 | 8/2015 | McCarthy |
| 2015/0278759 A1 | 10/2015 | Harris et al. |
| 2015/0310447 A1 | 10/2015 | Shaw |
| 2016/0012391 A1 | 1/2016 | Burnett |
| 2016/0055452 A1 | 2/2016 | Qin |
| 2016/0063604 A1 | 3/2016 | Shaffer et al. |
| 2016/0071056 A1 | 3/2016 | Ellison et al. |
| 2016/0092969 A1 | 3/2016 | Gopalsamy et al. |
| 2016/0148300 A1 | 5/2016 | Carr et al. |
| 2016/0171592 A1 | 6/2016 | Pugh et al. |
| 2016/0203543 A1 | 7/2016 | Snow |
| 2016/0223339 A1 | 8/2016 | Pellow et al. |
| 2016/0247113 A1 | 8/2016 | Rademaker |
| 2016/0253740 A1 | 9/2016 | Goulart |
| 2016/0258762 A1 | 9/2016 | Taylor et al. |
| 2016/0260158 A1 | 9/2016 | High et al. |
| 2016/0299782 A1 | 10/2016 | Jones et al. |
| 2016/0314429 A1 | 10/2016 | Gillen et al. |
| 2016/0321605 A1 | 11/2016 | Maifeld et al. |
| 2016/0350837 A1 | 12/2016 | Williams et al. |
| 2017/0024789 A1 | 1/2017 | Frehn et al. |
| 2017/0069013 A1 | 3/2017 | Castillo |
| 2017/0200108 A1 | 7/2017 | Au et al. |
| 2017/0213186 A1 | 7/2017 | Grifoni |
| 2017/0228701 A1 | 8/2017 | Wosk et al. |
| 2017/0278047 A1 | 9/2017 | Welty et al. |
| 2017/0285648 A1 | 10/2017 | Welty et al. |
| 2017/0369245 A1 | 12/2017 | Suemitsu et al. |
| 2018/0121992 A1 | 5/2018 | Agarwal et al. |
| 2018/0137452 A1 | 5/2018 | Khartravath et al. |
| 2018/0182054 A1 | 6/2018 | Yao et al. |
| 2018/0314991 A1 | 11/2018 | Grundberg |
| 2018/0342031 A1 | 11/2018 | Tada et al. |

FOREIGN PATENT DOCUMENTS

| | | |
|---|---|---|
| CN | 102137100 A | 7/2011 |
| CN | 102377629 A | 3/2012 |
| DE | 102012100354 | 7/2013 |
| WO | 2016119747 A1 | 8/2016 |
| WO | 2016119749 | 8/2016 |

\* cited by examiner

SYSTEM FOR PROVIDING OPTIMAL SHOPPING ROUTES IN RETAIL STORE AND METHOD OF USING SAME

BACKGROUND OF THE INVENTION

1. Field of the Invention

The present invention relates generally to shopping routes for retail stores and, more particularly, to a system for providing optimal shopping routes or pick paths in a retail store and method of using same.

2. Description of the Related Art

It is known that a large retailer typically has a number of retail stores with items or products stocked in the retail stores. Many consumers visit a specific retail store when shopping for items or products, for example, groceries, office supplies, household wares, etc. Typically, the specific retail store may have thousands of sections and hundreds of aisles for the items. For example, grocery stores are generally large in size and customers face huge problems in navigating to a specific item or product while planning their shopping trip inside the store.

Currently, some retailers may provide an indoor or in-store navigation path to route customers to the item, restrooms, food services, etc. However, these retailers do not provide an accurate navigation or pick path for picking these items. Further, there are no path alterations based on added/dropped any existing/new item along the original navigation path to the items location.

It is, therefore, desirable to provide a new system and method that provides optimal shopping routes or pick paths in a retail store for picking items on shopping lists of customers. It is also desirable to provide a new system and method that generates an optimal pick path using locations of items within a retail store. It is further desirable to provide a new system and method that will automatically adjust a pick path in the retail store if the customer decides to add/drop any existing/new item to their shopping list. Thus, there is a need in the art to provide a system for providing optimal shopping routes in a retail store and method of using same that meets at least one of these desires.

SUMMARY OF THE INVENTION

Accordingly, the present invention provides a system including a computing device configured to provide output to a user device of a customer. The computer system is configured to receive a shopping list of one or more items inputted by a user into a user application running on the user device and to generate a pick path through a retail store to pick the one or more items according to an optimization algorithm that generates the pick path based on XY location information of the one or more items within the retail store. The computer system is configured to obtain a store map, the store map being indicative of a layout of the retail store, to transmit a representation of the store map and the pick path to the user device, and to display the store map overlaid with the pick path on a graphical display of the user device.

In addition, the present invention provides a method including the steps of receiving, by a computing device, a shopping list of one or more items inputted by a user into a user application running on the user device. The method also includes the steps of generating, by the computing device, a pick path through a retail store to pick the one or more items according to an optimization algorithm that generates the pick path based on XY location information of the one or more items within the retail store. The method also includes the steps of obtaining, by the computing device, a store map, the store map being indicative of a layout of the retail store, transmitting, by the computing device, a representation of the store map and the pick path to the user device, and displaying the store map overlaid with the pick path on a graphical display of the user device.

Further, the present invention provides one or more non-transitory computer-readable storage media, having computer-executable instructions embodied thereon, wherein when executed by at least one processor to receive a shopping list of one or more items inputted by a user into a user application running on the user device. The computer-executable instructions further cause the processor to generate a pick path through a retail store to pick the one or more items according to an optimization algorithm that generates the pick path based on XY location information of the one or more items within the retail store. The computer-executable instructions further cause the processor to obtain a store map, the store map being indicative of a layout of the retail store, to transmit a representation of the store map and the pick path to the user device, and to display the store map overlaid with the pick path on a graphical display of the user device.

One advantage of the present invention is that a new system and method is provided for generating an optimal pick path using location of items within a retail store, for all items in a shopping list of a customer once provided with his/her shopping list, resulting in better customer in-store shopping experience. Another advantage of the present invention is that the system and method injects recommended or suggested items/products/designations which are not in a customer shopping list but are preferred by the customer. Yet another advantage of the present invention is that the system and method uses actual XY information of items locations (in-place of sequence numbers) for generating an accurate pick path or route for the customer in the retail store. Still another advantage of the present invention is that the system and method adjusts the pick path if the customer decides to add/drop any existing/new item within the retail store. A further advantage of the present invention is that the system and method provides an optimal pick path for a customer within a retail store, which will result in time saving and hence better shopping experience for the customer.

Other features and advantages of the present invention will be readily appreciated, as the same becomes better understood, after reading the subsequent description taken in conjunction with the accompanying drawings.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
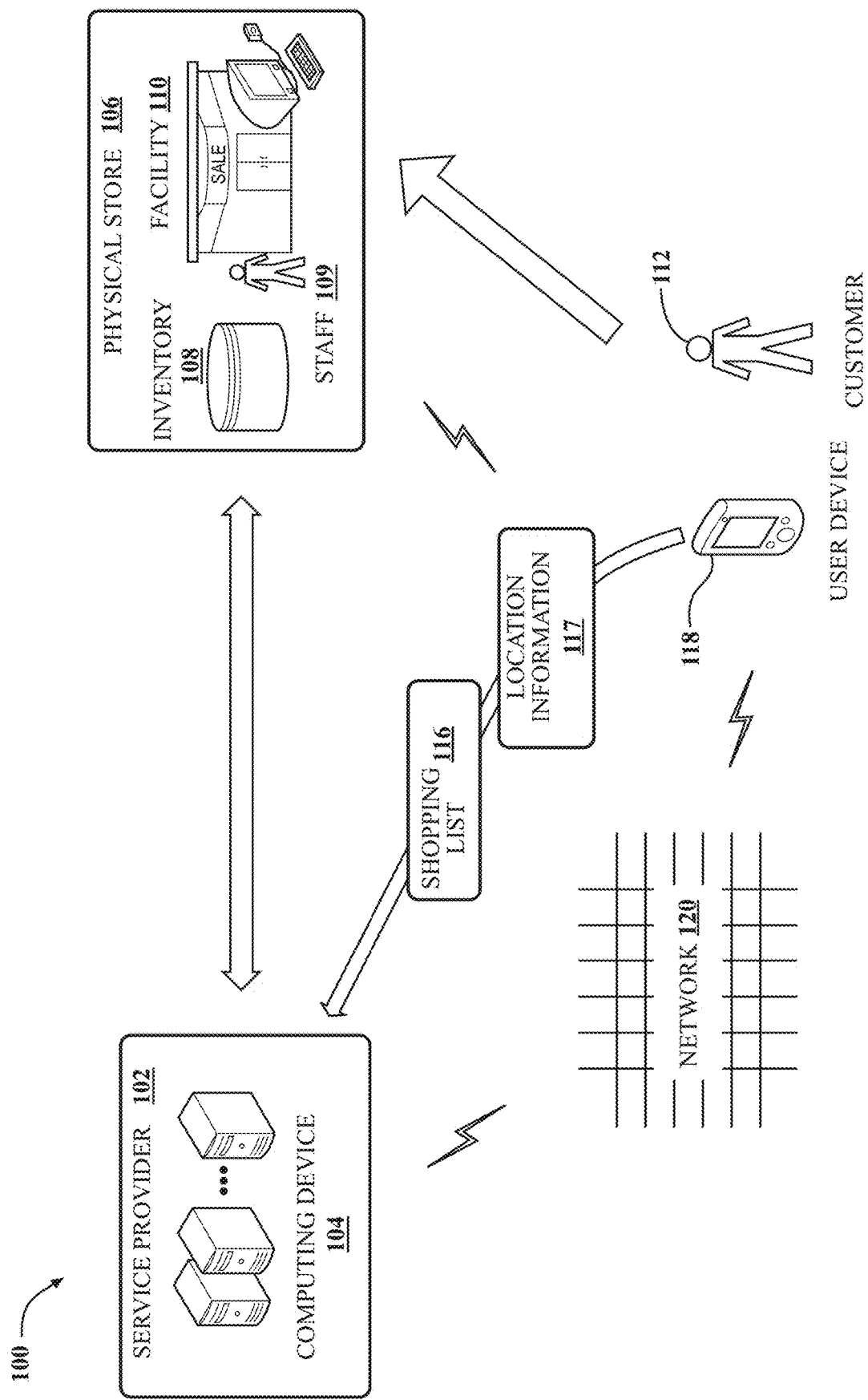
FIG. 1 is a diagrammatic view of a system for providing optimal shopping routes in a retail store, according to one embodiment of the present invention, illustrated in relationship with a retail store.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION OF THE PREFERRED EMBODIMENT(S)

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis.

With reference to the FIGS. and in operation, the present invention provides a system 100, methods and computer product media that facilitate optimal shopping routes in a retail store of the retailer. In particular, the present invention uses exact item information or (X,Y) coordinates, henceforth called XY location, for providing optimal shopping routes in a retail store.

For clarity in discussing the various functions of the system 100, multiple computers and/or servers are discussed as performing different functions. These different computers (or servers) may, however, be implemented in multiple different ways such as modules within a single computer, as nodes of a computer system, etc . . . . The functions as performed by the system 100 (or nodes or modules) may be centralized or distributed in any suitable manner across the system 100 and its components, regardless of the location of specific hardware. Furthermore, specific components of the system 100 may be referenced using functional terminology in their names. The function terminology is used solely for purposes of naming convention and to distinguish one element from another in the following discussion. Unless otherwise specified, the name of an element conveys no specific functionality to the element or component.

Referring to FIG. 1, an exemplary environment in which the system 100 for providing optimal shopping routes in a retail store of the retailer is illustrated. In particular, the present invention uses exact item information or (X,Y) location for providing optimal shopping routes within a physical retail store 106, according to one embodiment of the present invention, is illustrated. The system 100 may be configured for a large retailer having one or more retail stores 106 each having one or more items or products in the retail stores 106. The term "retail store" can include brick-and-mortar stores operated by a single retailer, e.g., supermarket or superstore, or a location that includes stores operated by multiple retailers, e.g., a shopping mall or a shopping plaza.

The system 100 includes a computing device 104, e.g., server, associated with a service provider 102. The service provider 102 may provide a service related to shopping for one or more customers, such as in-store fulfillment for the retail store 106. For example, the service may include a set of related software and/or hardware functionalities that, together with certain policies set by the service provider 102, enable the retail store 106 to manage an inventory 108 and staff 109 associated with a facility 110 of the retail store 106.

In some embodiments, the computing device 104 may receive a shopping list 116 from a first user or customer, such as a user device 118 used by a user or customer 112, for in-store pickup of the first item by the customer 112 at the store, such as the retail store 106. For example, the customer 112 may install and execute a software application on the user device 118, which may be a smartphone for example, and transmit the shopping list 116 via such software application. The software application may be provided by the service provider 102. The first item may include one or more items or products and/or one or more services. The shopping list 116 may or may not indicate a planned arrival time of customer 112.

The computing device 104 may also receive location information 117 from the user device 118 of the customer 112. The location information 117 may indicate geographic location of the user device 118 in the form of, for example, global positioning system (GPS) coordinates or a street address. Based on the location information 117, the computing device 104 may determine a location of the customer 112.

In some embodiments, the computing device 104 may receive data and/or information related to the customer 112 from the user device 118 via a network 120. The network 120 enables the computing device 104 to exchange information with the user device 118. The network 120 may include wired and/or wireless networks that enable communications between the various computing devices described in the system 100. In some embodiments, the network 120 may include local area networks (LANs), wide area networks (WAN), mobile telephone networks (MTNs), and other types of networks, possibly used in conjunction with one another, to facilitate communication between the various computing devices (e.g., user device 118). The user device 118 may be a mobile or desktop computer, a personal data assistant (PDA), an internet appliance, an internet enabled mobile phone, a server or any other computing device configured with a network connection. It should be appreciated that a customer-conformal shopping list routing is disclosed in U.S. Pat. No. 9,147,208, the entire disclosure of which is hereby incorporated in its entirety by reference.

Figure 2:
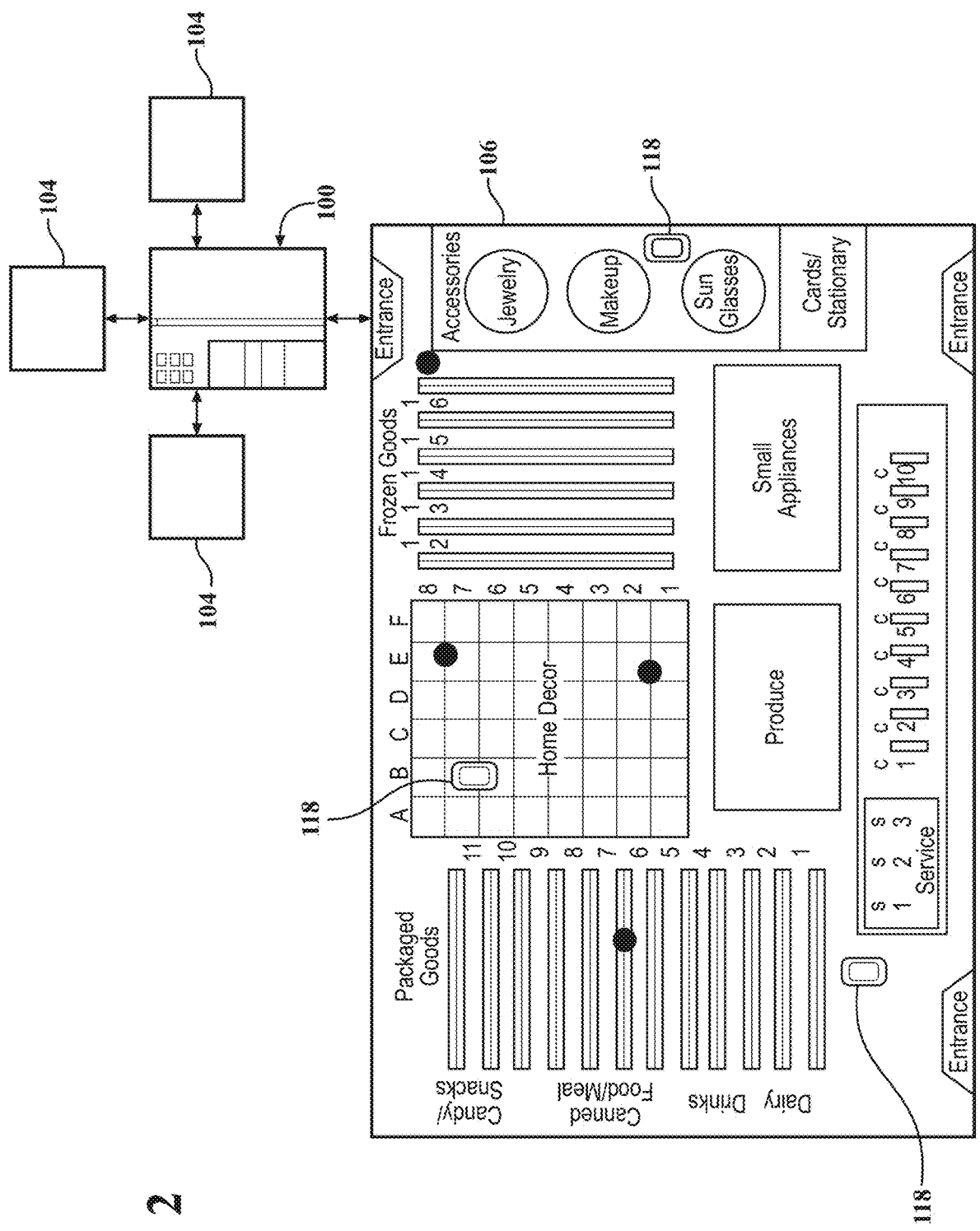
FIG. 2 is another diagrammatic view of the system of FIG. 1.

An exemplary retail store 106 is illustrated in FIG. 2 and can be arranged into different departments, such as packaged goods including dairy, drinks, canned foods/meals, and candy/snacksproduce; home decor; produce; frozen goods; small appliances; and accessories including jewelry, make-up, sunglasses, and cards/stationary. Each department can be further delineated. For example, the exemplary packaged goods area of the retail store 106 can be subdivided into aisles 1-11 and each aisle can define an "a" side and a "b" side opposite the "a" side. In one embodiment, for each aisle (cluster of modules), there may be bay types and aisle types. The exemplary home decor area can be divided into a grid by letters A-F along a first edge and numbers 1-8 along a second edge perpendicular to the first edge. The illustrated, exemplary retail store 106 can also include one or more entrances, a service counter, and several checkout lines each referenced in FIG. 2 by the letter "c" and a number. It should be appreciated that the arrangement of the retail store 106 is exemplary. It should also be appreciated that, in some embodiments of the present invention, the retail store 106 can be arranged differently and include different departments and/or different products and/or methods for labeling aisles.

The computing device 104 may also store location information corresponding to departments, product categories, product types, etc. The in-store location information may include one or more of, a 3-dimensional coordinate, a 2-dimensional coordinate, department identifier, section identifier, an aisle number, a row number, a display fixture identifier, a display container identifier, shelf height, and the like. In some embodiments, the location information is determined based a planogram of the shopping facility space. In one embodiment, the location information is based on (X, Y) coordinates, henceforth called XY location. In one embodiment, each item has an XY coordinate for its location within the retail store 106. It should be appreciated that the location information is stored in a database to be described.

Figure 3:
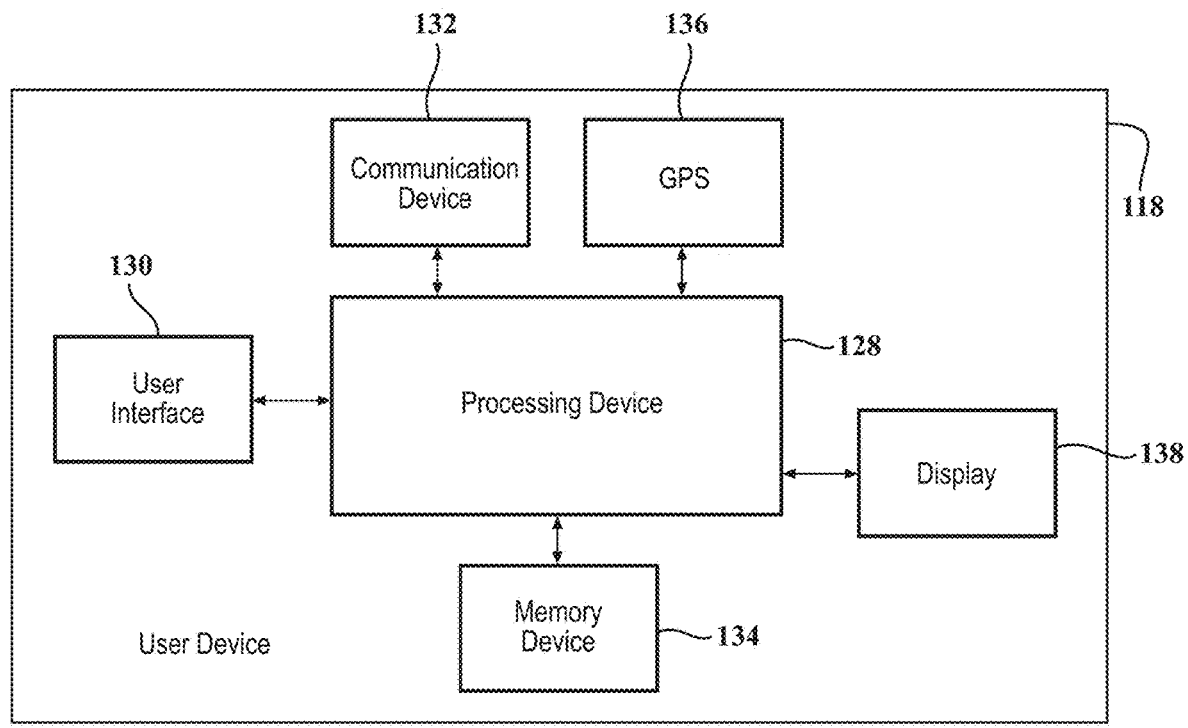
FIG. 3 is a diagrammatic view of a user device used with the system of FIG. 1.

Referring now to FIG. 3, a schematic illustrating example components of one user device 118 of FIG. 1 is illustrated. In the illustrative embodiment, the user device 118 includes a processing device 128, a user interface 130, a communication device 132, a memory device 134, a global positioning system (GPS) 136, and a display 138. It should be appreciated that the user device 118 can include other components and some of the components are not required.

The processing device 128 can include memory, e.g., read only memory (ROM) and random access memory (RAM), storing processor-executable instructions and one or more processors that execute the processor-executable instructions. In embodiments where the processing device 128 includes two or more processors, the processors can operate in a parallel or distributed manner. The processing device 128 can execute the operating system of the user device 118.

The user interface 130 is a device that allows a user to interact with the user device 118. While one user interface 130 is shown, the term "user interface" can include, but is not limited to, a touch screen, a physical keyboard, a mouse, a microphone, and/or a speaker. The communication device 132 is a device that allows the user device 118 to communicate with another device, e.g., the server computing device 104 via the network 120. The communication device 132 can include one or more wireless transceivers for performing wireless communication and/or one or more communication ports for performing wired communication. The memory device 134 is a device that stores data generated or received by the user device 118. The memory device 134 can include, but is not limited to, a hard disc drive, an optical disc drive, and/or a flash memory drive.

The GPS 136 is a device that determines a location of the user device 118 by communicating with a plurality of GPS satellites. The GPS 136 can perform known triangulation techniques to determine the GPS coordinates of the user computing device 107, 118. It should be appreciated that while a GPS 136 is shown, any other suitable component for determining the location of the user device 118 can be implemented.

The display 138 of the user device 118 may be a graphical user interface (GUI) that displays information to be described. The GUI further includes a plurality of input objects which allow the user to provide commands to the user device 118. In some embodiments, the system 100 may return an item or product waypoint corresponding to an item or product in the retail store 106, each item waypoint indicating a physical location of a specific item in the retail store 106. The display 138 can display the item waypoints to the user via the GUI. In some embodiments, the item waypoints can be displayed in a store map of the retail store 106. In some embodiments, the server computing device 104 can return a map of the retail store 106 and waypoints corresponding to the items or products and map to the user device 118. The user device 118 can display the store map, such that the waypoints are displayed in the map. It should be appreciated that, in some embodiments, the user interface 130 and the display 138 may be one in the same.

Figure 4:
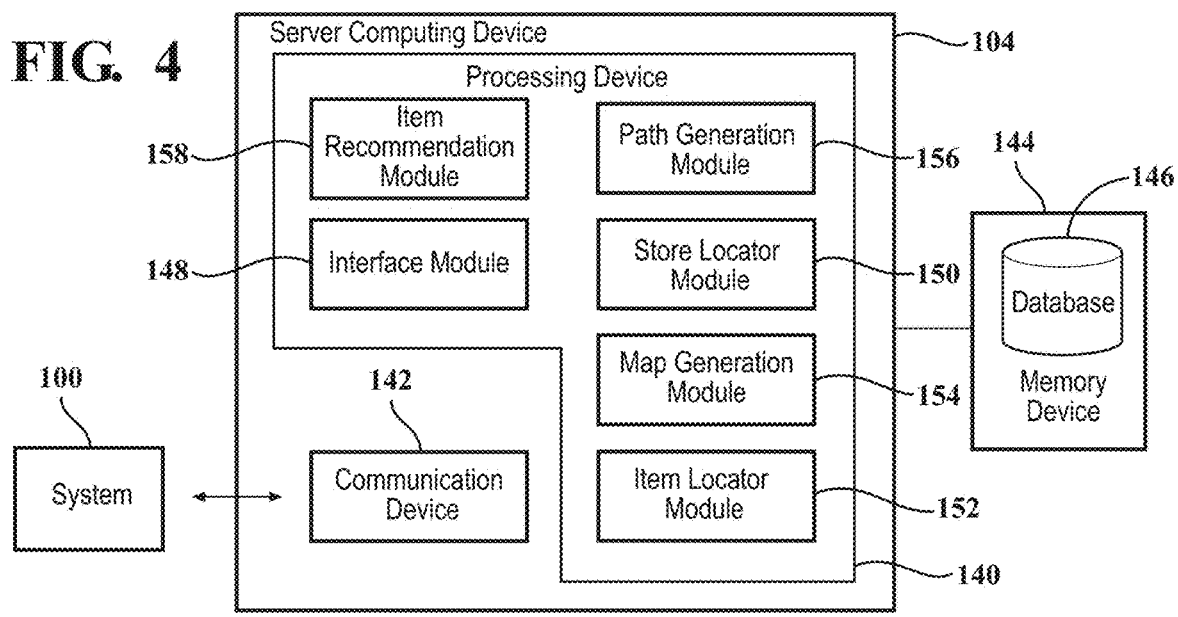
FIG. 4 is a diagrammatic view of one portion of the system of FIG. 1.

Referring to FIG. 4, the server computing device 104 may include a processing device 140, a communication device 142, and memory device 144 having one or more database 146. The processing device 140 can include memory, e.g., read only memory (ROM) and random access memory (RAM), storing processor-executable instructions and one or more processors that execute the processor-executable instructions. In embodiments where the processing device 140 includes two or more processors, the processors can operate in a parallel or distributed manner. In the illustrative embodiment, the processing device 140 executes one or more modules such as an interface module 148, a store locator module 150, an item locator module 152, a map generation module 154, a path generation module 156, and an item recommendation module 158.

The communication device 142 is a device that allows the server computing device 104 to communicate with another device, e.g., the user device 118, via the network 120. The communication device 142 can include one or more wireless transceivers for performing wireless communication and/or one or more communication ports for performing wired communication. The communication device 142 is accessible to the processing device 140.

The memory device 144 is a device that stores data generated or received by the server computing device 104. The memory device 144 can include, but is not limited to a hard disc drive, an optical disc drive, and/or a flash memory drive. Further, the memory device 144 may be distributed and located at multiple locations. The memory device 144 is accessible to the processing device 140. In some embodiments, the memory device 144 stores the database 146.

The modules 148, 150, 152, 154, 156, 158 include software and/or hardware modules implementing the methods disclosed herein. In some embodiments, the modules 148, 150, 152, 154, 156, 158 and data of the modules 148, 150, 152, 154, 156, 158 are implemented or accessed by the server computing device 104 or some other entity that provides an interface to the modules 148, 150, 152, 154, 156, 158.

The database 146 may include item data for items or products located in the retail store 106. Accordingly, the server computing device 104 may host or access the database 146 of items located in the retail store 106. The database 146 may store a plurality of item or product records. The item records may have one or more brands associated therewith. A brand for an item or product may represent the manufacturer, seller, importer, or the like for a product and/or a manufacturer of a component part of a product, or other reference to an entity participating in the production and offer for sale of a product.

The database 146 may include map data for a map of the retail store 106. Accordingly, the server computing device 104 may host or access the database 146 for a map of the retail store 106. The database 146 may store a plurality of maps for a plurality of retail stores 106. It should be appreciated that each map is produced from a CAD drawing of each retail store 106.

The database 146 stores maps corresponding to different retail locations of the retail stores 106. Each map can be divided into a plurality of regions. A region can describe any type of boundary in the retail location. For instance, in the supermarket setting, a region can refer to a section, e.g., deli or frozen foods, one or more aisles, e.g., aisle, a checkout station, and/or a bank of checkout stations. In some embodiments, the regions may be defined by a collection of geospatial coordinates, e.g., GPS coordinates. Additionally, each map may have metadata associated therewith. Furthermore, for each retail location, the database 146 may store item locations for the items sold at the retail location. In one embodiment, the item location may be an XY coordinate in the retail store 106. Each item has an aisle location which has a GPS coordinates or a relative location, e.g., "Brand X Cereal" is located at aisle nine, 50 feet from the front of the aisle. The map is a CAD drawing that is processed into a scalable vector graphic (SVG). It should be appreciated that, when the aisle location of an item is changed to a new aisle, the location inherently changes as well because the aisles are fixed to locations. It should also be appreciated that, as used herein, the term "map" may refer to a digital representation of the layout of the corresponding store location of the retail store 106.

In some embodiments, the database 146 stores item waypoints indicating physical locations of the items sold by the retailer in a particular or specific retail store 106 operated or associated with the retailer. For example, the database 146 may store the location of "milk" in the retail store 106 operated or associated with the retailer.

The database 146 may be configured to store waypoints for specific items and generic items. For example, the database 146 may be configured to store waypoints indicating the location of "ice cream," a generic item, and the location of "Brand X ice cream," a specific item. It should be noted that a waypoint corresponding to a generic item or specific item may be represented using a starting location and ending location. For example, a waypoint corresponding to "ice cream" may indicate where the ice cream section begins and where the "ice cream" section ends. Similarly, a waypoint corresponding to "Brand X ice cream" may indicate where the Brand X's ice cream begins and ends. It should be appreciated that when a specific item is a species of a generic item, e.g., Brand X ice cream is a species of "ice cream," the waypoint corresponding to a specific item may be wholly contained within the waypoint corresponding to the generic item. It should further be appreciated that one system or database links products to aisles and the other system or database links aisles to locations, which are both combined to get locations for items in the aisles.

As discussed, the processing device 144 may execute the store locator module 150. The store locator module 150 receives a location from the user device 118 and determines one or more store locations of the retail store 106 corresponding to the received location. In some embodiments, the store locator module 150 queries the database 146 of store locations with the received location and receives the store location of the retail store 106 that correspond to the received location.

The item locator module 152 receives an input of items to be located in the retail store 106 and determines item waypoints corresponding to one or more items or products. In some embodiments, the item locator module 152 queries the database 146 with the items and a store location (which may have been determined by the store locator module 150) and receives item waypoints indicating a location of the items indicated in the retail store 106 corresponding to the store location.

Once the item locator module 152 has determined the various waypoints, e.g., item waypoints, the item locator module 152 may provide the item waypoints to the user device 118, such that the user device 118 can display the item waypoints. It should be appreciated that the user device 118 can display the item waypoints in an electronic store map for the retail store 106.

The map generation module 154 can generate maps for each map stored in the database 146 or can generate a map upon receiving a request for a map for a particular location of the retail store 106 from a requesting device, e.g., a user device 118, or a requesting process, e.g., a location or route optimization process. For purposes of explanation, the description of the map generation module 154 assumes that the maps are generated in response to a request for a map for a particular location of the retail store 106. It should be appreciated that the techniques described herein can be modified to generate maps for all of the retail locations in the database 146 at defined intervals, e.g., every 15 minutes.

The map generation module 154 can receive a request to generate a map for a particular retail location. In response to the request, the map generation module 154 retrieves a map corresponding to the particular retail location from the database 146. Furthermore, the map generation module 154 can receive inputs for each region of the retail location from the system 100. For example, the map generation module 154 can receive inputs indicating (L, R, P) from the system 100, where L is the retail store location, R is a region of the retail location, and P is a product in the region R. The map generation module 154 receives these inputs for each of the regions in the particular retail location. It should be appreciated that the map generation module 154 only knows the aisle locations for the items and nothing about the items themselves.

In some embodiments, the map generation module 154 may be further configured to obtain a map corresponding to the location of the retail store 106. The map generation module 154 can obtain the map from the database 146. In some of these embodiments, the map generation module 154 can provide the map and the item waypoints to the user device 118. In other embodiments, the map generation module 154 can render the map with one or more waypoints displayed therein. In these embodiments, the map generation module 154 may use the locations indicated by the various waypoints to determine locations in the map where the graphical icons should be displayed. The map generation module 154 can then insert the graphical icons at the determined locations. The map generation module 154 can provide the rendered image to the user device 118.

The path generation module 156 determines an optimized pick path or route to pick the items in the shopping list. The path determination module 156 generate a pick path through the retail store 106 to pick the one or more items according to an optimization algorithm that generates the optimized pick path based on XY location information of the one or more items within the retail store 106. In some embodiments, the path generation module 156 is configured to optimize the route or pick path to minimize the amount of distance traveled and/or the amount of time spent traveling through the retail store 106 to pick the items.

The item recommendation module 158 determines at least one or more suggested or recommended items preferred by the customer based on the items in the shopping list, each suggested/recommended item being indicative of an item or product preferred by the customer and sold at the location of the retail store 106. The suggested/recommended items are determined from an algorithm in the item recommendation module 158.

Figure 6:
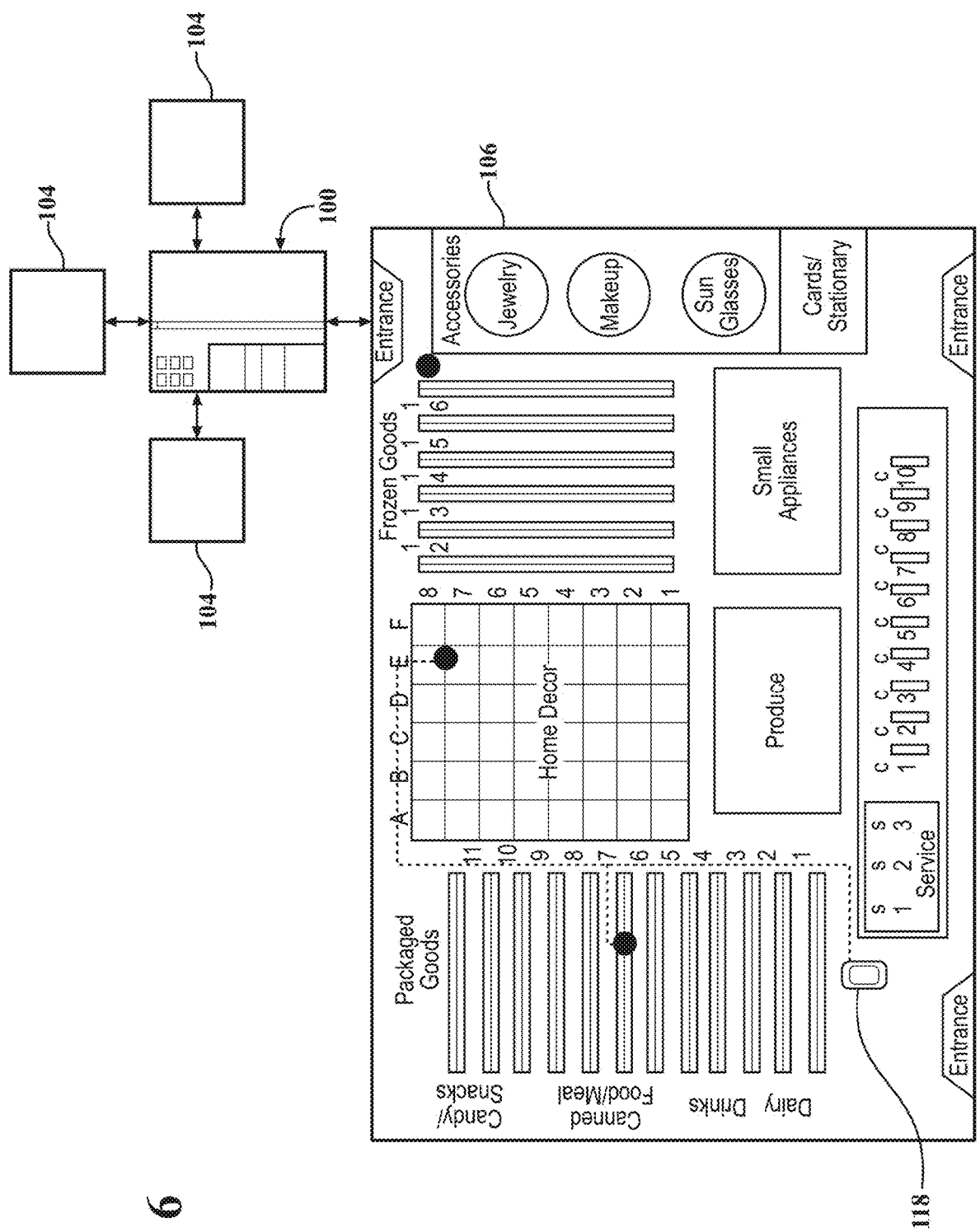
FIG. 6 is a diagrammatic view of an exemplary pick path within the retail store of FIG. 1.

Referring again to FIG. 6, the path generation module 156 receives a list of suggested/recommended items relating to the items in the pick path. The suggested/recommended items are provided by the item recommendation module 158. The path generation module 156 decides which of the suggested/recommended items are in proximity to the initial pick path to create an adjusted pick path for the store map. The path generation module 156 suggests at least one or more items based on the items in the shopping list, each item being indicative of an item or product sold at the location of the retail location 12. The suggested items are determined from an algorithm in the item recommendation module 158 based on the items in the shopping list. The path generation module 156 determines paths that include the nearby recommendations or suggested items based on proximity. The algorithm generates suggested items that are closest to the initial pick path from XY coordinates of the items within a predetermined distance, e.g., four feet, of the initial pick path. The path generation module 66 generates the adjusted pick path based on the suggested items and presents the initial pick path and the adjusted pick path positioned overlaid on the store map to the user device 118 for display. It should be appreciated that the path generation module 156 can determine the adjusted pick path in any suitable manner. It should also be appreciated that the path generation module 156 can be configured to optimize the adjusted pick path in any suitable manner.

The system 100 links the server computing device 104 to transmit and provide a physical location of the items in the retail store 106. The store map is overlaid with icons or waypoints and optimized pick path on the display 138 of the user device 118. The store map represents the retail store 106 and the waypoints for the items and navigation path are positioned overlaid on the store map to designate a physical location of the items in the retail store 106. It should be appreciated that the store map is a full-screen map and the items are displayed along the pick path or in an item/product information section on the store map such that a waypoint and pick path for each item will appear on the store map.

Figure 5:
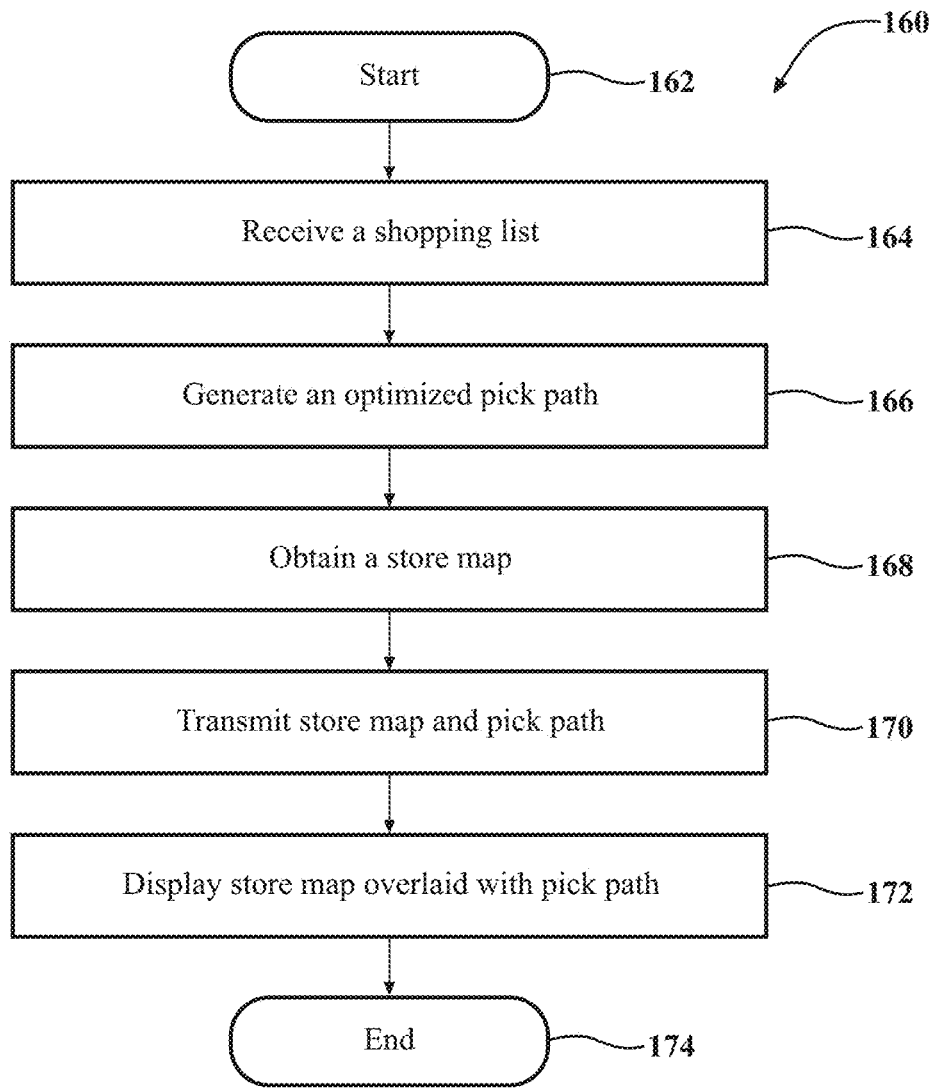
FIG. 5 is a flowchart of a method, according to one embodiment of the present invention, of using the system of FIGS. 1 through 4.

Referring to FIG. 5, a method, according to the present invention, for providing optimal shopping routes or pick paths in the retail store 106 is disclosed. The method uses Item-Item XY distance data to provide optimal shopping routes or pick paths for picking items in the retail store 106. An example method 160, according to one embodiment of the present invention, using the system 100 is illustrated. The method 160 can be executed by the components illustrated in FIGS. 1 through 4. In general, a flowchart of the method 160, according to one embodiment of the present invention, starts in bubble 162. The method 160 includes the steps of receiving a shopping list from the customer 112 in block 164. For example, receiving, by the server computing device 104 or the system 100, a shopping list of items from the customer 112 to be picked in the retail store 106. The method includes the steps of generating an optimized pick path in block 166. For example, generating, by the computing device 104 or the system 100, an optimized pick path through the retail store 106 to pick the one or more items according to an optimization algorithm that generates the pick path based on XY location information of the one or more items within the retail store 106. The method 160 includes the steps of obtaining a store map with locations for items within the retail store 106 in block 168. For example, obtaining, by the server computing device 104 or system 100, a store map of the retail store 106, the store map being indicative of a layout of the retail store 106 and the one or more items. The method 160 may include the steps of identifying the items with aisle locations that match map data or XY coordinates. For example, identifying, by the server computing device 104 or system 100, the items with aisle and/or bay locations that match map data for the store map. The method 160 includes the steps of transmitting the store map and pick path in block 170. For example, transmitting, by the server computing device 104 or system 100, a representation of the store map and the optimized pick path to the user device 118. The method 160 further includes displaying the store map overlaid with the optimized pick path on a graphical display of the user device 118 in block 172. For example, displaying, by the server computing device 104 or system 100, the store map overlaid with the optimized pick path on the graphical display 138 of the user device 118, wherein each of the items being associated with a physical location of the item in the retail store 106 and presenting the store map overlaid with a waypoint on the display 138 of the user device 118, wherein the store map represents the retail store 106 and the waypoint and optimized pick path is positioned overlaid on the map to designate a physical location of a corresponding one of the one or more items. The method ends in block 174. It should be appreciated that the method includes other steps such as providing the computer system and servers and coupling the servers to one another.

In operation, the customer 112 prepares his/her list before going to the retail store 106 on the user application. The optimization algorithm will generate an optimal pick route or path for the customer 112 through the retail store 106 based on XY location information of the one or more items within the retail store 106. The optimization algorithm will also inject recommended items which are not in the customer list but preferred by the customer 112. The optimization algorithm will automatically adjust the pick path if the customer 112 decides to add/drop any existing/new item to the list.

Algorithm 1 Picking Optimizer
1: procedure GETBESTPATH(XYdata, itemList);
2: randomSolutionList=generateRadomSolutions(itemList, XYdata);
3: topSolutions=getTopSolutions(randomSolutionList);
4: while not converged or finite steps do;
5: solutionList=getNextGeneration(XYdata, topSolutions)
6: topSolutions=getTopSolutions(solutionList); and
6. generateRandomSolutions—method randomly generates valid complete pick path solutions and getNextGeneration—next generation solutions are created by top solutions of current generation.

Figure 7:
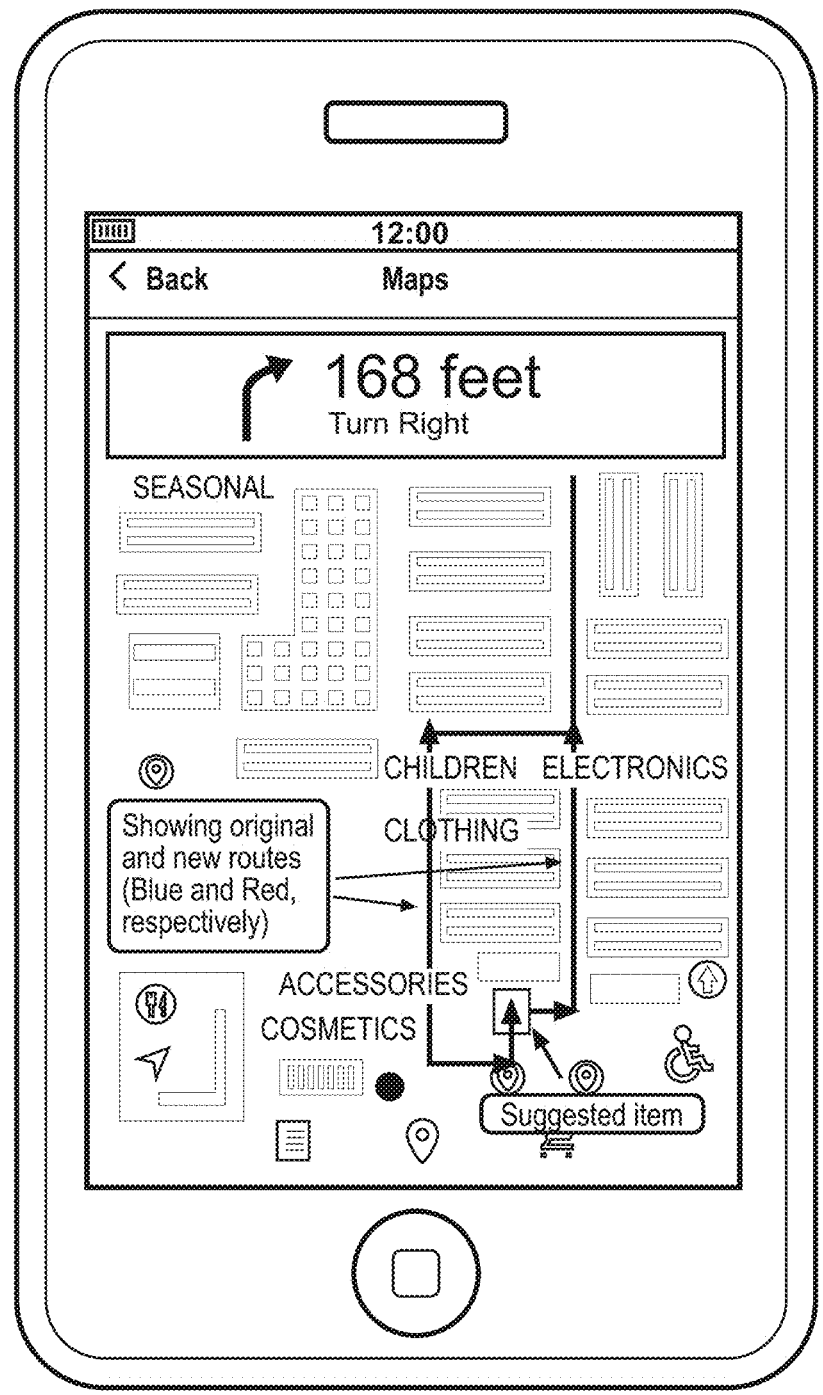
FIG. 7 is an illustration of an exemplary screenshot of the user device of FIG. 3 used with the system of FIG. 1.

Referring to FIG. 7, an exemplary pick path for the retail store 106 is shown. As illustrated, an initial pick path may be generated for the customer 112 showing the path in dotted lines from the user device 118 of the customer 112 to the item waypoints for the items on the shopping list. The path generation module 156 can display the store map to the customer 112 via the display 138 (FIG. 3). In the illustrated example, the item waypoints are displayed as graphical icons, e.g., black circles. For example, the store map may include a first item waypoint (e.g., location of "milk") and a second item waypoint (e.g., location of "cheese") in the dairy section. It should be appreciated that the recommended items are based on proximity to the initial pick path for the items in the shopping list. It should also be appreciated that the system 100 is configured to define an initial pick path from one of a current location of the customer, selected location by the customer, or an estimated location of the customer and the locations for the items being navigated to.

In some embodiments, the user device 118 can display a map and a navigation or pick path for the retail store 106 on the display 138 of the user device 118 to the customer 112. On the display 138, the map for the retail store 106 is displayed on the display 138. Each of the items in the list includes a waypoint, which appears on the map on the display 138 for the retail store 106. For example, a customer may have listed an item or product such as "hot dogs". The store map displays an initial pick path for the user device 118 to the item waypoint. In the example above, if hot dog buns are nearby, the store map will display an adjusted route or pick path for the user device 118 to the item waypoints for the hot dogs and hot dog buns. In another example, if the customer is on their way to "Toys" to pickup a radio controlled (RC) car, the initial pick path is updated to include batteries needed by the RC car. As illustrated, the initial or original pick path and adjusted pick path are displayed on the display 138 of the user device 118. In addition, the initial pick path and adjusted pick path can be displayed in different colors on the display 138 of the user device 118. As can be appreciated, the item waypoints can identify a specific aisle if the item indicated by the item is in an aisle. Otherwise, a description of the section of the item, e.g., "Produce" or "Sunglasses," can be used to show the location of the item. It should be appreciated that this example is provided for example only and not intended to be limiting.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A system comprising:
a computing device configured to provide output to a graphical user interface on a user device of a user wherein the computing device is configured to perform:
receiving a shopping list of one or more items inputted by the user into a user application running on the user device;

generating an initial pick path through a retail store to pick the one or more items according to an optimization algorithm that generates a route for the initial pick path based on XY location information of the one or more items within the retail store;

determining one or more other items relating to the one or more items on the initial pick path, wherein the one or more other items are located within a predetermined distance based on the XY location information of the one or more items on the initial pick path;

generating an adjusted pick path based on a location of the one or more other items to the XY location information of the one or more items on the initial pick path;

obtaining a store map, wherein the store map comprises a layout of the retail store;

transmitting a representation of the store map, the initial pick path, and the adjusted pick path to the graphical user interface on the user device; and sending instructions to display, on the graphical user interface on the user device, the store map overlaid with the initial pick path and the adjusted pick path.

2. The system in claim 1,
wherein the computing device is further configured to perform:
generating an icon being associated with a respective physical location of each of the one or more items in the retail store; and
wherein sending the instructions to display further comprises:
sending instructions to display, on the graphical user interface on the user device, the icon, wherein the icon and the initial pick path are positioned overlaid on the store map to designate the respective physical location of the each of the one or more items in the retail store.

3. The system in claim 2,
wherein determining the one or more other items further comprises:
recommending at least one item;
wherein generating the icon comprises:
generating an other icon being associated with a physical location of the at least one item, as recommended;
wherein generating the adjusted pick path further comprises:
automatically adjusting the initial pick path to comprise the physical location of the at least one item, as recommended; and
wherein sending the instructions to display further comprises:
sending instructions to display, on the graphical user interface on the user device, the other icon overlaid on the store map to designate the physical location of the at least one item in the retail store.

4. The system in claim 1,
wherein generating the initial pick path further comprises:
automatically adjusting the initial pick path based on the one or more items being added or dropped from the shopping list; and
wherein sending the instructions to display further comprises:
sending the instructions to display, on the graphical user interface on the user device, the initial pick path, as automatically adjusted, positioned overlaid on the store map.

5. The system in claim 2:
wherein the computing device comprises a path generation module configured to perform:
monitoring a current location of the user;
acquiring an in-store location for the one or more items; and
wherein generating the initial pick path further comprises:
providing the initial pick path from the current location to the in-store location.

6. The system in claim 3:
wherein the computing device comprises a path generation module configured to perform:
monitoring a current location of the user; and
acquiring an in-store location for the at least one item, as recommended; and
wherein generating the adjusted pick path further comprises:
providing the adjusted pick path from the current location to the in-store location.

7. The system in claim 6:
wherein the computing device comprises a path generation module configured to perform:
monitoring a current location of the user; and
acquiring an in-store location for the one or more items being added or dropped from the shopping list; and
wherein generating the initial pick path further comprises:
providing the initial pick path, as automatically adjusted, from the current location to the in-store location.

8. The system in claim 1, wherein the computing device is further configured to perform:
storing, by an item location database, a plurality of waypoints corresponding to the retail store, including one or more item waypoints, wherein each item waypoint of the plurality of waypoints comprises a respective icon indicating a specific item in the retail store, and wherein each of the plurality of waypoints are obtained from the item location database.

9. The system in claim 1, wherein the computing device comprises a path generation module configured to perform:
rendering an image of the store map having an item waypoint and the initial pick path displayed therein, wherein the image, including the initial pick path, is provided to the graphical user interface on the user device for display.

10. The system in claim 1, wherein the computing device is further configured to perform:
generating, by a map generation module, the store map showing a physical location of the one or more items on the store map.

11. A method comprising:
receiving, by a computing device, a shopping list of one or more items inputted by a user into a graphical user interface on a user application running on a user device;
generating, by the computing device, an initial pick path through a retail store to pick the one or more items according to an optimization algorithm that generates a route for the initial pick path based on XY location information of the one or more items within the retail store;
determining, by the computing device, one or more other items relating to the one or more items on the initial pick path, wherein the one or more other items are located within a predetermined distance based on the XY location information of the one or more items on the initial pick path;

generating, by the computing device, an adjusted pick path based on a location of the one or more other items to the XY location information of the one or more items on the initial pick path;

obtaining, by the computing device, wherein a store map, the store map comprises a layout of the retail store;

transmitting, by the computing device, a representation of the store map, the initial pick path and the adjusted pick path to the graphical user interface on the user device; and sending instructions to display the store map overlaid with the initial pick path and the adjusted pick path on the graphical user interface on of the user device.

12. The method in claim 11 further comprising:
generating, by the computing device, an icon being associated with a respective physical location of each of the one or more items in the retail store;
wherein sending the instructions to display further comprises:
sending instructions to display, by the computing device, on the graphical user interface on the user device, the store map overlaid with the icon and the initial pick path, wherein the initial pick path to the icon are positioned overlaid on the store map to designate the respective physical location of the each of the one or more items for the retail store.

13. The method in claim 12 wherein determining the one or more other items further comprises:
recommending, by the computing device, at least one item;
wherein generating the icon comprises:
generating an other icon being associated with a physical location of the at least one item, as recommended;
wherein generating the adjusted pick path further comprises:
automatically adjusting, by the computing device, the initial pick path to comprise the physical location of the at least one item, as recommended; and
wherein sending the instructions to display further comprises:
sending instructions to display, on the graphical user interface on the user device, the other icon overlaid on the store map to designate the physical location of the at least one item in the retail store.

14. The method in claim 11:
wherein generating the initial pick path further comprises:
automatically adjusting, by the computing device, the initial pick path based on the one or more items being added or dropped from the shopping list; and
wherein sending the instructions to display further comprises:
sending the instructions to display, on the graphical user interface on the user device, the initial pick path, as automatically adjusted, positioned overlaid on the store map.

15. The method in claim 11, further comprising:
monitoring a current location of the user;
acquiring an in-store location for the one or more items; and
wherein generating the initial pick path further comprises:
providing the initial pick path from the current location to the in-store location.

16. The method in claim 11, including the further comprising:
monitoring a current location of the user; and
acquiring an in-store location for at least one item, as recommended; and
wherein generating the adjusted pick path further comprises:
providing the adjusted pick path from the current location to the in-store location.

17. The method in claim 11, further comprising:
monitoring a current location of the user; and
acquiring an in-store location for the one or more items being added or dropped from the shopping list; and
wherein generating the initial pick path further comprises:
providing the initial pick path, as automatically adjusted, from the current location to the in-store location.

18. The method in claim 11, further comprising:
rendering an image of the store map having an item waypoint and the initial pick path displayed therein, wherein the image, including the initial pick path, is provided to the graphical user interface on the user device for display.

19. The method in claim 11, further comprising:
rendering, by the computing device, a map showing a physical location of the one or more items in the retail store.

20. One or more non-transitory computer-readable storage media, having computer-executable instructions embodied thereon, wherein when executed by at least one processor, the computer-executable instructions cause the processor to perform:
receiving a shopping list of one or more items inputted by a user into a user application running on a graphical user interface on a user device;
generating an initial pick path through a retail store to pick the one or more items according to an optimization algorithm that generates a route for the initial pick path based on XY location information of the one or more items within the retail store;
determining one or more other items relating to the one or more items on the initial pick path, wherein the one or more other items are located within a predetermined distance based on the XY location information of the one or more items on the initial pick path;
generating an adjusted pick path based on a location of the one or more other items to the XY location information of the one or more items on the initial pick path;
obtaining a store map, wherein the store map comprises a layout of the retail store;
transmitting a representation of the store map, the initial pick path, and the adjusted pick path to the graphical user interface on the user device; and
sending instructions display the store map overlaid with the initial pick path and the adjusted pick path on the graphical user interface on the user device.

* * * * *